US010257229B1

United States Patent
(12) United States Patent
Kuo et al.

(10) Patent No.: US 10,257,229 B1
(45) Date of Patent: Apr. 9, 2019

(54) SYSTEMS AND METHODS FOR VERIFYING USERS BASED ON USER MOTION

(71) Applicant: Symantec Corporation, Mountain View, CA (US)

(72) Inventors: Chengi Kuo, Manhattan Beach, CA (US); Petrus J. Viljoen, Manhattan Beach, CA (US)

(73) Assignee: Symantec Corporation, Mountain View, CA (US)

(*) Notice: Subject to any disclaimer, the term of this patent is extended or adjusted under 35 U.S.C. 154(b) by 248 days.

(21) Appl. No.: 15/156,742

(22) Filed: May 17, 2016

(51) Int. Cl.
*H04L 29/06* (2006.01)
*H04W 4/02* (2018.01)

(52) U.S. Cl.
CPC .............. *H04L 63/20* (2013.01); *H04L 63/08* (2013.01); *H04L 63/102* (2013.01); *H04L 63/107* (2013.01); *H04L 63/1433* (2013.01); *H04W 4/02* (2013.01)

(58) Field of Classification Search
CPC ....... H04L 63/20; H04L 63/08; H04L 63/102; H04L 63/107; H04L 63/1433; H04W 4/02; G06F 21/31
See application file for complete search history.

(56) References Cited

U.S. PATENT DOCUMENTS

2013/0194066 A1* 8/2013 Rahman .................. G05B 1/01 340/5.51
2013/0326636 A1* 12/2013 Prchal .................. H04L 63/308 726/28
2014/0082694 A1* 3/2014 Sanghavi ................ G06F 21/31 726/3
2016/0063492 A1* 3/2016 Kobres ................. G06F 21/316 705/16
2017/0180348 A1* 6/2017 Piccolotto .......... G06K 9/00906
2017/0223017 A1* 8/2017 Kohli ............... G06Q 20/40145

OTHER PUBLICATIONS

Casale et al., "Personalization and user verification in wearable systems using biometric walking patterns", pp. 563-580, Journal of Personal and Ubiquitous Computing, vol. 16, Issue 5, Jun. 2012 (Year: 2012).*

Mehedi Hassan, Windows 10's Companion Device Framework will allow users to unlock their PC with a companion device, https://mspoweruser.com/windows-10s-companion-device-framework-will-allow-users-unlock-pc-companion-device/, (Apr. 11, 2016).

(Continued)

*Primary Examiner* — Eleni A Shiferaw
*Assistant Examiner* — Hee K Song
(74) *Attorney, Agent, or Firm* — FisherBroyles, LLP

(57) ABSTRACT

The disclosed computer-implemented method for verifying users based on user motion may include (1) instructing a user of a mobile device to physically move in a prescribed manner, (2) receiving information, collected by one or more sensors associated with the mobile device, describing physical movement performed by the user after the user receives the instruction, (3) determining, upon receiving the information, that the user's physical movement matches the prescribed movement, and (4) verifying the user in response to determining that the user's physical movement matches the prescribed movement. Various other methods, systems, and computer-readable media are also disclosed.

20 Claims, 7 Drawing Sheets

Database
120

User Sequences 122

| | |
|---|---|
| User 1 | (1) Move device from left to right, (2) Move device from high to low, (3) Shake device |
| User 2 | (1) Take two steps forward with device, (2) Stop, (3) Take three steps backwards with device, (4) Spin in a circle |
| User 3 | Face a camera attached to the device and (1) Wave right hand, (2) Lean left, (3) Clap |
| User 4 | (1) Cover light sensor long, (2) Uncover light sensor short, (3) Cover light sensor short, (4) Uncover light sensor long |
| User 5 | (1) Clap to the beat of "Happy Birthday" |

(56) References Cited

OTHER PUBLICATIONS

Andy Greenberg, Gesture-Based Login Apps for iPad and iPhone Aim to Banish Passwords From Touchscreens, http://www.forbes.com/sites/andygreenberg/2011/11/10/gesture-based-login-apps-for-ipad-and-iphone-aim-to-banish-passwords-from-touchscreens/2/#1c7832af3c19, (Nov. 10, 2011).
Shuja Shahzada et al., Gesture Authentication for Mobile Devices, http://cups.cs.cmu.edu/soups/2014/workshops/papers/gestures_shahzada_19.pdf, Symposium on Usable Privacy and Security: Adventures in Authenticaion Workshop 2014, (Jul. 9, 2014).
Vaibhav Kanth et al., Hand Gesture Recognition Based 3D CAPTCHA, http://ijre.org/wp-content/uploads/2014/08/18-51-1-PB.pdf, International Journal of Research and Engineering, Issue 2, vol. 1, (2014).
David Pogue, Use It Better: Eight Alternatives to the Hated Captcha, https://www.scientificamerican.com/article/pogue-8-alternatives-to-hated-captcha/, Scientific American, (Feb. 28, 2012).
Data loss prevention software, https://en.wikipedia.org/wiki/Data_loss_prevention_software, as accessed Mar. 22, 2016, Wikipedia, (May 9, 2010).
Sensor, http://whatis.techtarget.com/definition/sensor, as accessed Mar. 22, 2016, Part of the Electronics glossary, WhatIs.com, TechTarget, (On or before Jul. 2012).
Bill Hammack, the Engineer guy, How a Smartphone Knows Up from Down, http://www.engineerguy.com/elements/videos/video-accelerometer.htm, as accessed Mar. 22, 2016, (May 29, 2012).
Ryan Goodrich, Accelerometers: What They Are & How They Work, http://www.livescience.com/40102-accelerometers.html, LiveScience, (Oct. 1, 2013).
Mobile device detection, https://en.wikipedia.org/wiki/Mobile_device_detection, as accessed Mar. 22, 2016, Wikipedia, (Dec. 2, 2011).
CAPTCHA: Telling Humans and Computers Apart Automatically, http://www.captcha.net/,as accessed Mar. 22, 2016, (Jul. 23, 2001).
JingSong Cui et al., CAPTCHA Design Based on Moving Object Recognition Problem, http://cmp.felk.cvut.cz/~cernyad2/TextCaptchaPdf/CAPTCHA%20Design%20Based%20on%20Moving%20Object.pdf, 2010 3rd International Conference on Information Sciences and Interaction Sciences (ICIS), (Jun. 23-25, 2010).

* cited by examiner

Database
120

User Sequences 122

---------------------------------------------------------------------------------
**************************************************

| User | Sequence |
|---|---|
| User 1 | (1) Move device from left to right, (2) Move device from high to low, (3) Shake device |
| User 2 | (1) Take two steps forward with device, (2) Stop, (3) Take three steps backwards with device, (4) Spin in a circle |
| User 3 | Face a camera attached to the device and (1) Wave right hand, (2) Lean left, (3) Clap |
| User 4 | (1) Cover light sensor long, (2) Uncover light sensor short, (3) Cover light sensor short, (4) Uncover light sensor long |
| User 5 | (1) Clap to the beat of "Happy Birthday" |

**************************************************

---------------------------------------------------------------------------------

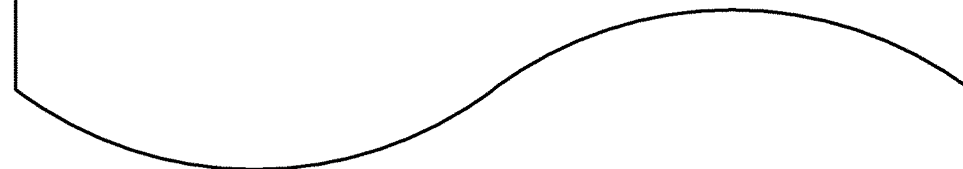

*FIG. 5*

SYSTEMS AND METHODS FOR VERIFYING USERS BASED ON USER MOTION

BACKGROUND

Online services are under constant attack by automated procedures engineered by malicious entities. In some instances, these automated attacks may attempt to log into legitimate user accounts (e.g., using brute force) or may attempt to push legitimate users away from online goods and resource (e.g., by beating them to online sales).

Many online services respond to such threats by implementing protocols that require users to verify that they are human before allowing them to complete certain tasks. Traditional protocols may involve a question and answer sequence that requires users to recognize an image (e.g., a CAPTCHA image) and submit information describing the content included within the image. However, sometimes these images may be difficult for users to successfully parse, resulting in failed verification attempts and user frustration. Furthermore, on smaller nonstandard devices (e.g., cellular phones, wearables, etc.), the use of these traditional image analysis protocols may be difficult or infeasible (e.g., if the image is difficult to display or view due to the small size of the device's screen).

The size of a small device may also make traditional authentication protocols cumbersome or difficult. For example, authentication protocols that require users to submit passwords may be difficult to complete from devices that are not coupled to keyboards. Accordingly, the instant disclosure identifies a need for improved systems and methods for verifying the humanness and/or identity of users, especially in instances in which the size of a user's device makes traditional methods inconvenient or infeasible.

SUMMARY

As will be described in greater detail below, the instant disclosure describes various systems and methods for verifying users based on user motion. In one example, a computer-implemented method for verifying users based on user motion may include (1) instructing a user of a mobile device to physically move in a prescribed manner, (2) receiving information, collected by one or more sensors associated with the mobile device, describing physical movement performed by the user after the user receives the instruction, (3) upon receiving the information, determining that the user's physical movement matches the prescribed movement, and then (4) verifying the user in response to determining that the user's physical movement matches the prescribed movement.

In some examples, the disclosed method may verify the user by verifying that the user is a human. In other examples, the disclosed method may verify the user by verifying an identity of the user. In these examples, the disclosed method may further include (1) prior to instructing the user to physically move in the prescribed manner, obtaining, from the user, a sequence of physical movements that the user wishes to use for authentication purposes, and (2) defining the prescribed movement as the sequence of physical movements obtained from the user. In one example, the disclosed method may include obtaining the sequence of physical movements from the user as part of a registration process.

In one embodiment, the one or more sensors may include (1) a motion sensor, (2) a global positioning system (GPS) receiver, and/or (3) a pedometer. In some examples, instructing the user to physically move in the prescribed manner may include instructing the user to perform a motion-related activity that involves physically moving the mobile device.

In some examples, instructing the user to perform the motion-related activity may include (1) instructing the user to move the mobile device from a current spatial location to a new spatial location, (2) instructing the user to move the mobile device in a certain direction, (3) instructing the user to shake the mobile device, (4) instructing the user to move the mobile device in accordance with a designated pattern, and/or (5) instructing the user to physically move the mobile device for a specified amount of time.

In some examples, instructing the user to move the mobile device to the new spatial location may include (1) instructing the user to move the mobile device to a spatial location that is to the left of the current spatial location, (2) instructing the user to move the mobile device to a spatial location that is to the right of the current spatial location, (3) instructing the user to move the mobile device to a spatial location that is above the current spatial location, (4) instructing the user to move the mobile device to a spatial location that is below the current spatial location, (5) instructing the user to move the mobile device to a spatial location that is in front of the current spatial location, and/or (6) instructing the user to move the mobile device to a spatial location that is behind the current spatial location.

In some examples, instructing the user to move the mobile device in the certain direction may include (1) instructing the user to move the mobile device laterally, (2) instructing the user to move the mobile device vertically, (3) instructing the user to move the mobile device diagonally, (4) instructing the user to move the mobile device clockwise, and/or (5) instructing the user to move the mobile device counterclockwise. In some examples, instructing the user to perform the motion-related activity may include instructing the user to take one or more steps with the mobile device on his or her person.

In some embodiments, the one or more sensors may include (1) a light sensor, (2) a visual sensor, (3) a thermal sensor, (4) a heartbeat sensor, and/or (5) an audio sensor. In embodiments in which the one or more sensors include a light sensor, instructing the user to physically move in the prescribed manner may include instructing the user to (1) cover the light sensor, (2) uncover the light sensor, and/or (3) alternate covering and uncovering the light sensor in accordance with a specified pattern. In embodiments in which the one or more sensors include a visual sensor, instructing the user to physically move in the prescribed manner may include instructing the user to physically move (i.e., in the prescribed manner) within a visual field of the visual sensor such that the visual sensor may capture the user's physical movement.

In one embodiment, the steps of the disclosed method may be performed as part of a web service that provides online services to the user. In this embodiment, (1) the web service may include a policy that requires its users to be verified before allowing the users to perform a certain digital action, and (2) instructing the user to physically move in the prescribed manner may include instructing the user in response to determining that the user is attempting to perform the certain digital action.

In some examples, the certain digital action may include (1) logging into a user account managed by the web service, (2) modifying the user account managed by the web service, and/or (3) using the web service to complete a transaction. In one embodiment, the disclosed method may further include, upon verifying the user, allowing the user to perform the certain digital action.

In some embodiments, the steps of the disclosed method may be performed as part of a third-party service. In these embodiments, the third-party service may provide verification services to a web service and the web service may provide online services to the user. In some such embodiments, instructing the user to physically move in the prescribed manner may include instructing the user in response to receiving, from the web service, a request to verify the user.

In one embodiment, a system for implementing the above-described method may include (1) an instruction module, stored in memory, that instructs a user of a mobile device to physically move in a prescribed manner, (2) a receiving module, stored in memory, that receives information, collected by one or more sensors associated with the mobile device, describing physical movement performed by the user after the user receives the instruction, (3) a determination module, stored in memory, that determines, upon the receiving module receiving the information, that the user's physical movement matches the prescribed movement, (4) a verification module, stored in memory, that verifies the user in response to the determination module determining that the user's physical movement matches the prescribed movement, and (5) a physical processor configured to execute the instruction module, the receiving module, the determination module, and the verification module.

In some examples, the above-described method may be encoded as computer-readable instructions on a non-transitory computer-readable medium. For example, a computer-readable medium may include one or more computer-executable instructions that, when executed by one or more processors of a computing device, may cause the computing device to (1) instruct a user of a mobile device to physically move in a prescribed manner, (2) receive information, collected by one or more sensors associated with the mobile device, describing physical movement performed by the user after the user receives the instruction, (3) determine, upon receiving the information, that the user's physical movement matches the prescribed movement, and (4) verify the user in response to determining that the user's physical movement matches the prescribed movement.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram illustrating an exemplary database of user sequences used for verifying the identity of users.

Figure 1:
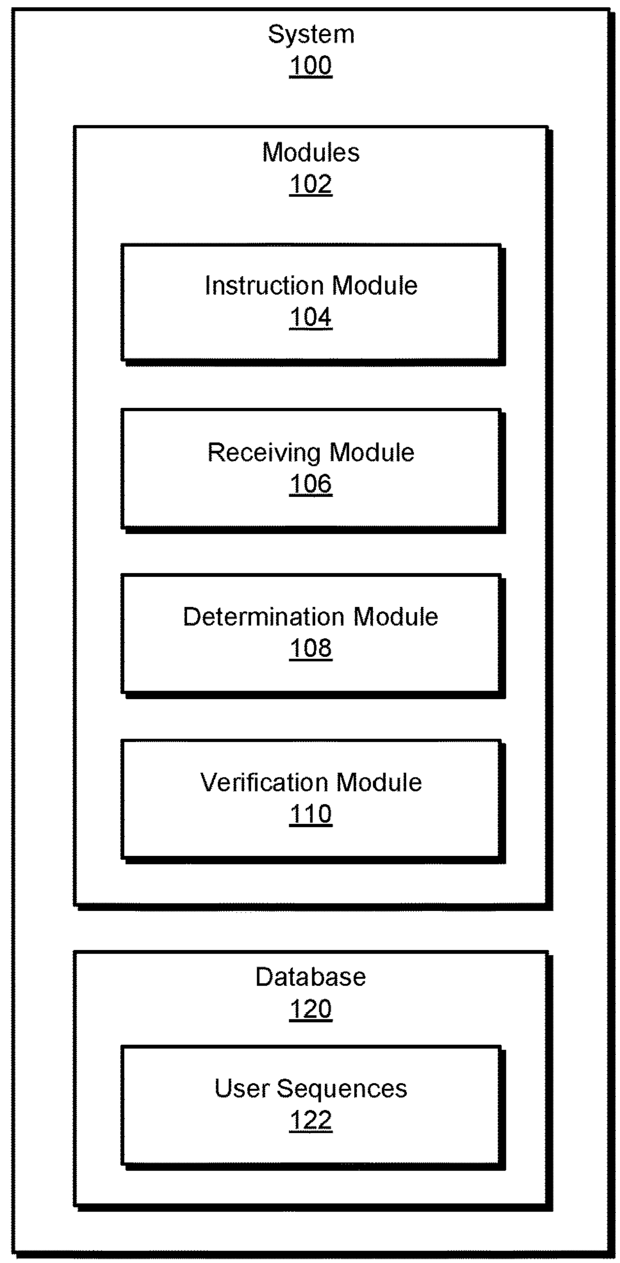
FIG. 1 is a block diagram of an exemplary system for verifying users based on user motion.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for verifying users based on user motion. As will be explained in greater detail below, the disclosed systems and methods may provide motion-based verification protocols for verifying users based on their ability to successfully complete motion-based tasks. The motion-based tasks may involve a user moving a user device and/or the user moving himself or herself (e.g., without moving the user device) within a certain proximity of the user device. These protocols may rely on sensors, built into the user device, that are capable of collecting motion data from which the user's motion may be deduced.

The disclosed verification protocols may provide an alternative to traditional human verification techniques that verify users based on their ability to interpret images. The disclosed verification protocols may be an especially beneficial alternative to traditional human verification techniques when the user is using a device with a small screen (e.g., a cellphone or smart watch screen) on which it may be difficult or impossible to view detailed images. The disclosed verification protocols may also provide an alternative to traditional authentication techniques that authenticate users based on the users' ability to input text-based information into a device.

The following will provide, with reference to FIGS. 1-2 and 4-5, detailed descriptions of exemplary systems for verifying users based on user motion. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for verifying users based on user motion. As illustrated in this figure, exemplary system 100 may include one or more modules 102 for performing one or more tasks. For example, and as will be explained in greater detail below, exemplary system 100 may include an instruction module 104 that instructs a user of a mobile device to physically move in a prescribed manner. Exemplary system 100 may additionally include a receiving module 106 that receives information, collected by one or more sensors associated with the mobile device, describing physical movement performed by the user after the user receives the instruction.

Exemplary system 100 may also include a determination module 108 that determines, upon receiving the information, that the user's physical movement matches the prescribed movement. Exemplary system 100 may additionally include a verification module 110 that verifies the user in response to determining that the user's physical movement matches the prescribed movement. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., user device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store user sequences 122 to be used for user authentication. Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
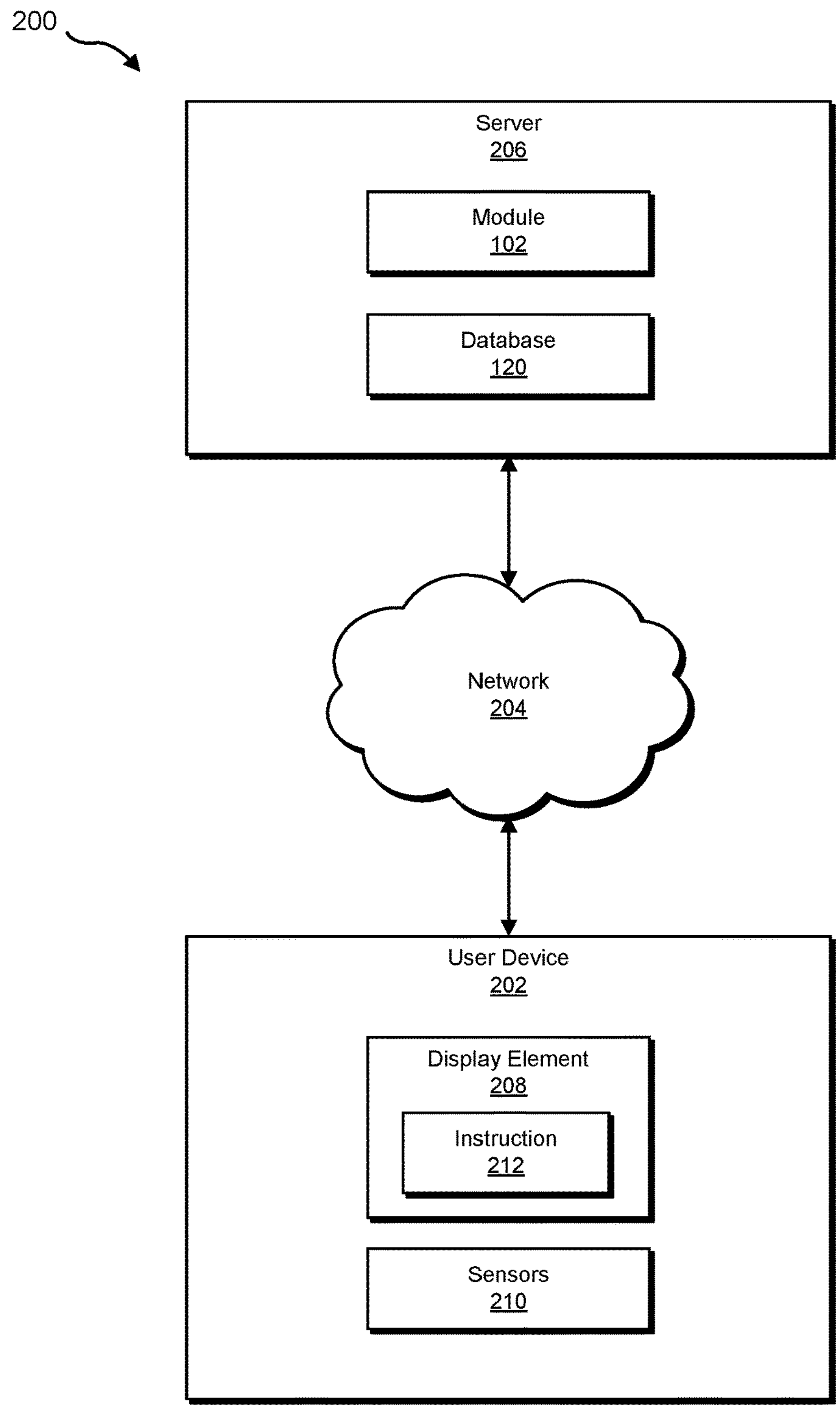
FIG. 2 is a block diagram of an additional exemplary system for verifying users based on user motion.

Exemplary system 100 in FIG. 1 may be implemented in a variety of ways. For example, all or a portion of exemplary system 100 may represent portions of exemplary system 200 in FIG. 2. As shown in FIG. 2, system 200 may include a user device 202 in communication with a server 206 via a network 204. In one example, user device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of user device 202 and/or server 206, enable user device 202 and/or server 206 to verify users based on user motion. For example, and as will be described in greater detail below, instruction module 104 may instruct a user of user device 202 to physically move in a prescribed manner (e.g., by displaying an instruction 212 to physically move in a prescribed manner on display element 208 of user device 202). Receiving module 106 may receive information, collected by one or more sensors 210 embedded within or otherwise associated with user device 202, describing physical movement performed by the user after the user receives instruction 212. Determination module 108 may determine, upon receiving module 106 receiving the information, that the user's physical movement matches the prescribed movement. Verification module 110 may verify the user in response to determination module 108 determining that the user's physical movement matches the prescribed movement.

User device 202 generally represents any type or form of user computing device capable of reading computer-executable instructions. Examples of user device 202 include, without limitation, laptops, tablets, desktops, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

In one embodiment, a user may be using user device 202 to access a webpage that is attempting to verify the user and/or that requires the user to complete a verification process before allowing the user to complete certain digital actions. In this embodiment, the webpage may be associated with server 206.

In some examples, user device 202 may represent a mobile device capable of being moved by the user. Additionally or alternatively, user device 202 may be communicatively coupled to one or more auxiliary devices (such as a webcam) that are moveable. In some examples, user device 202 may operate within a network of devices, such as an Internet of Things (IoT) network. In these examples, user device 202 may communicate with other devices that are also operating within the network.

In some examples, user device 202 may be embedded with (or otherwise connected to) one or more sensors, such as sensors 210. In other examples, user device 202 may be in communication with an additional device (e.g., via an IoT network) that is embedded with (or otherwise connected to) sensors 210. Sensors 210 generally represent any type or form of input system that detects input from its physical environment. In one example, sensors 210 may represent a microelectromechanical system embedded within user device 202.

Sensors 210 may represent a variety of types of sensors. In some examples, sensors 210 may represent one or more motion sensors. In one embodiment, the motion sensors may detect motion occurring in the physical environment surrounding user device 202. For example, the motion sensors may send out a form of energy (e.g., microwave, ultrasonic waves, light beams, etc.) and detect disruptions in the flow of energy.

In addition, or as an alternative, to detecting motion in the environment surrounding user device 202, the motion sensors may (e.g., in embodiments in which the motion sensors are embedded within user device 202) detect motion undergone by user device 202 itself. The motion sensors may identify a variety of types of motion undergone by user device 202. For example, the motion sensors may identify an orientation of user device 202, a direction in which user device 202 is moving, a speed at which user device 202 is moving, etc. In some examples, the motion sensors may identify motion undergone by user device 202 using axis-based motion sensing. In one such example, the motion sensors may take the form of an accelerator chip embedded within user device 202.

In some examples, sensors 210 may operate as part of a global positioning system (GPS) receiver embedded within user device 202. In these examples, the GPS receiver may identify a geographic location of user device 202 and/or a change in the geographic location of user device 202. Additionally or alternatively, the GPS receiver may identify a geographic direction in which user device 202 is moving (e.g., north, southwest, etc.) and/or a change in direction. Similarly, the GPS receiver may identify a speed at which user device 202 is moving and/or a change in speed.

In some examples, sensors 210 may represent one or more sensors capable of measuring a number of steps taken by a user carrying user device 202 on his or her person. In some such examples, sensors 210 may operate as part of a pedometer and/or a device with pedometer capabilities. In some such examples, sensors 210 may measure the number of steps taken by the user based on a motion of the user's hands, arms, and/or hips.

In some examples, sensors 210 may represent one or more light sensors capable of detecting changes in visible light. In one such example, user device 202 may select a level of brightness for its screen based on an amount of light detected by its light sensors. In this example, it may be possible for a user to manipulate the amount of light detected by the light sensors by covering the light sensors.

In some examples, sensors 210 may represent one or more visual sensors capable of capturing images within their visual field. In some such examples, the visual sensors may be capable of visually capturing motion that occurs within their visual field. For example, sensors 210 may operate as part of a digital video camera.

In some examples, sensors 210 may represent one or more thermal sensors capable of measuring temperature, or changes in temperature, in their surrounding area. In one example, the thermal sensors may operate as part of a thermostat that may be manipulated by the user. In another example, the thermal sensor may operate as part of a digital thermometer. In these examples, user device 202 may be capable of receiving data from the thermostat and/or thermometer. For example, user device 202 may receive information from the thermostat and/or thermometer describing a temperature of the environment and/or a change in temperature in the environment. In one example, the thermostat and/or the thermometer may operate within a same IoT network as user device 202.

In some examples, sensors 210 may represent one or more heartbeat sensors capable of collecting data relating to the user's heartbeat. In some such examples, sensors 210 may be embedded within a wearable fitness device. In these examples, user device 202 may either represent a wearable fitness device or be capable of receiving information from a wearable fitness device. Finally, in some examples, sensors 210 may represent one or more audio sensors capable of capturing sound in the audio sensors' surrounding area.

Server 206 generally represents any type or form of computing device that is capable of verifying users. In some examples, server 206 may represent a verifying system capable of verifying an identity of a user and/or verifying that the user is human. Examples of server 206 include, without limitation, application servers and database servers configured to provide various database services and/or run certain software applications. In some embodiments, server 206 may operate as part of a web service that provides services to users. In alternative embodiments, server 206 may operate as part of a third-party service that provides verification services to a web service (e.g., a web service that provides services to users).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between user device 202 and server 206.

Figure 3:
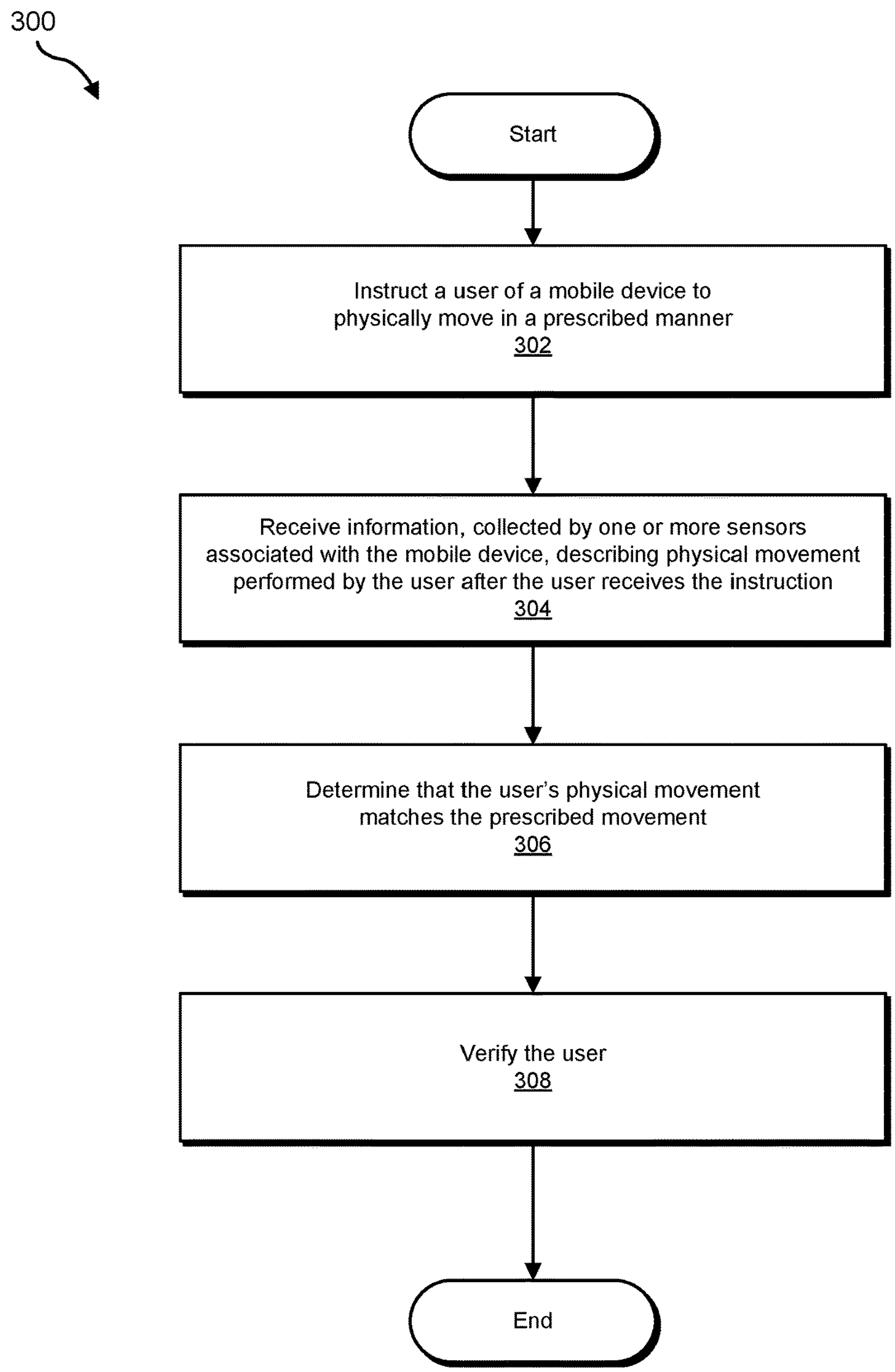
FIG. 3 is a flow diagram of an exemplary method for verifying users based on user motion.

FIG. 3 is a flow diagram of an exemplary computer-implemented method 300 for verifying users based on user motion. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may instruct a user of a mobile device to physically move in a prescribed manner. For example, instruction module 104 may, as part of server 206 in FIG. 2, present a user of user device 202 with an instruction 212 to physically move in a prescribed manner.

In some examples, instruction module 104 may instruct the user as part of a verification protocol. As used herein, the term "verification protocol" generally refers to any type or form of procedure for verifying an online user. In some examples, the verification protocol may be directed at verifying that a user is a human (e.g., that digital user actions are not automated actions). In additional or alternative examples, the verification protocol may be directed at verifying (e.g., authenticating) that a user has a particular identify. For example, the verification protocol may be directed at corroborating that a user has an identity that the user purports to have.

Instruction module 104 may initiate the verification protocol (e.g., by presenting the user with instruction 212) in response to a variety of events. For example, in one embodiment, instruction module 104 may operate as part of a web service that provides web services to the user. The web service may include a policy that requires its users to be verified before allowing the users to perform a certain digital action. In this embodiment, instruction module 104 may present the user with instruction 212 in response to detecting that the user is attempting to perform the certain digital action. The certain digital action may include many different actions, including, without limitation, logging into a user account managed by the web service, modifying the user account, and/or using the web service to complete a transaction.

In another embodiment, instruction module 104 may operate as part of a third-party service. The third-party service may provide verification services to a web service and the web service may provide certain online services to the user. In this embodiment, instruction module 104 may present the user with instruction 212 in response to receiving, from the web service, a request to verify the user. In some examples, the web service may send the request in response to detecting that the user has attempted to complete one of the certain digital actions described above.

Figure 4:
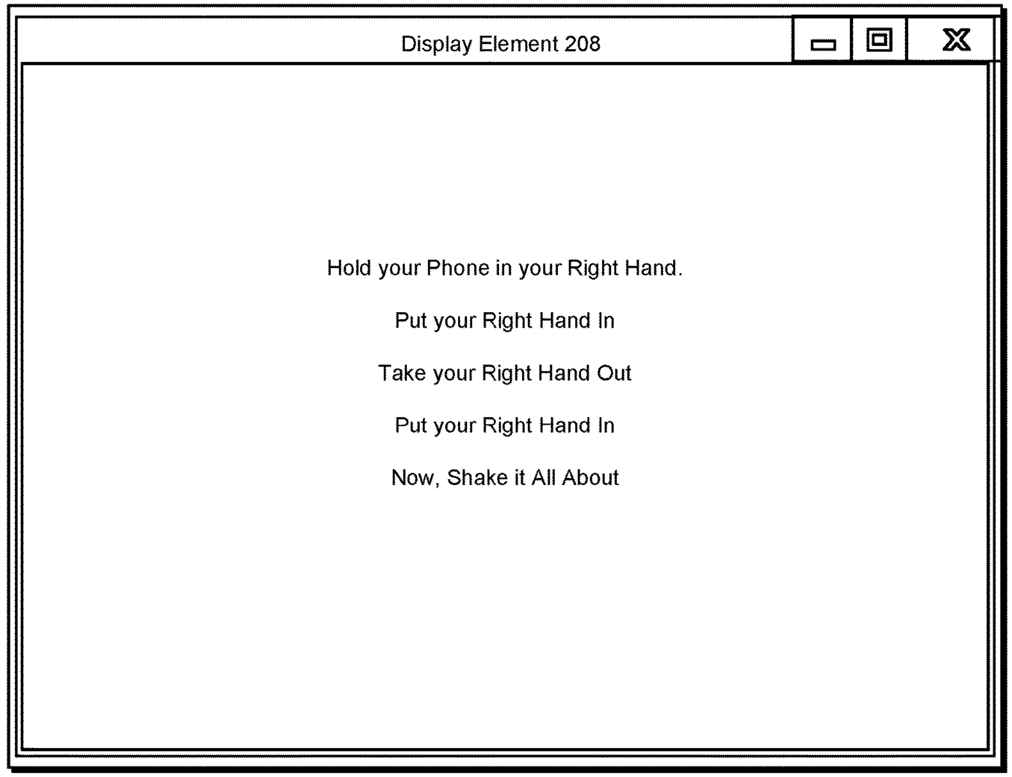
FIG. 4 is a block diagram of an exemplary display element used for verifying users based on user motion.

Instruction module 104 may present the user with instruction 212 in several ways. In some examples, instruction module 104 may display a written version of instruction 212 in a display element 208 on a screen of user device 202, as shown in FIGS. 2 and 4. In additional or alternative examples, instruction module 104 may present an audio version of instruction 212 via speakers attached to user device 202.

Instruction 212 may include a wide variety of directives. In some examples, instruction 212 may instruct the user to perform a motion-related activity that involves physically moving user device 202. Instruction 212 may instruct the user to physically move user device 202 in many different ways. In some examples, instruction 212 may instruct the user to move user device 202 from a current spatial location (e.g., a current spatial location of user device 202 and/or a current spatial location of the user) to a new spatial location. For example, instruction 212 may instruct the user to move user device 202 to a spatial location that is to the left of the current spatial location, to the right of the current spatial location, above the current spatial location, below the current spatial location, in front of the current spatial location, and/or behind the current spatial location.

In additional or alternative examples, instruction 212 may instruct the user to move the mobile device in a certain direction. For example, instruction 212 may instruct the user to move user device 202 laterally, vertically, diagonally, clockwise, and/or counterclockwise. In one example, instruction 212 may direct the user to move user device 202 in the certain direction by rotating user device 202. Additionally or alternatively, instruction 212 may direct the user to move user device 202 in the certain direction by extending a limb that is holding user device 202. In additional or alternative examples, instruction 212 may instruct the user to shake user device 202 and/or to take one or more steps with user device 202 on his or her person. In some embodiments, instruction 212 may specify an amount of time for which the user should physically move the mobile device.

In some examples, instruction 212 may instruct the user to move the mobile device in accordance with a designated pattern. Using FIG. 4 as a specific example, instruction 212 (as displayed in display element 208 in FIG. 4) may direct the user to (1) hold user device 202 in the user's right hand (i.e., "Hold your Phone in your Right Hand"), (2) extent the user's right hand forward (i.e., "Put your Right Hand In"), (3) retract the user's right hand backward (i.e., "Take your Right Hand Out"), (4) re-extend the user's right hand forward (i.e., "Put your Right Hand In"), and finally (5) shake user device 202 (i.e., "Now Shake it All About").

In some examples, an instruction to move user device 202 may represent an instruction to physically move user device 202 as a whole, as opposed to an instruction to move elements displayed on the screen of user device 202. For example, instruction 212 may instruct the user to change the spatial location of an entire device (e.g., user device 202 in its entirety) without the user inputting text-based and/or image-based information through a touchscreen, mouse, and/or keyboard. In these examples, the disclosed systems and methods may collect verifying information from motion data collected by motion sensors embedded within user device 202, instead of collecting verifying information from input received from the user through a touchscreen, mouse, and/or keyboard.

In addition, or as an alternative, to directing the user to physically move user device 202 in some way, instruction 212 may instruct the user to physically move himself or herself (i.e., without moving user device 202) in a way that sensors embedded within user device 202 may capture. For example, in embodiments in which user device 202 is attached to one or more visual sensors, instruction 212 may instruct the user to move in a certain way within a visual field of the visual sensors such that the visual sensors may capture the user's physical movement. To give a specific example, user device 202 may represent a device embedded with a video camera and instruction 212 may direct the user to make a specified motion, or a series of specified motions, at the camera. Examples of such specified motions may include, without limitation, waving, saluting, jumping, winking, wiggling an ear, touching a nose, covering an eye with a hand, shaking, bending, standing up, sitting down, etc.

Additionally or alternatively, in embodiments in which user device 202 is attached to one or more audio sensors, instruction 212 may direct the user to move in a certain way that makes a noise such that the audio sensors may capture the noise caused by the user's physical movement. Examples of such physical movements may include, without limitation, clapping, whistling, snapping, etc.

Additionally or alternatively, in embodiments in which user device 202 is attached to one or more light sensors, instruction 212 may instruct the user to move in a way that affects the amount of light received by the light sensors. For example, instruction 212 may instruct the user to cover and/or uncover the light sensors. In some examples, instruction 212 may instruct the user to alternate covering and uncovering the light sensors in accordance with a certain pattern outlined in instruction 212. To give a specific example, instruction 212 may instruct the user to (1) cover the light sensor for a short period (e.g., 1 second), (2) uncover the light for the short period, and then (3) cover the light for a long period (e.g., 3 seconds), thereby creating the letter "U" in Morse code.

Additionally or alternatively, in embodiments in which user device 202 receives data from one or more heartbeat sensors, instruction 212 may instruct the user to move in a way that affects the heartbeat data detected by the heartbeat sensors. To give a specific example, instruction 212 may instruct the user to, while wearing the heartbeat sensors, (1) remain stationary for a certain amount of time and then (2) perform an activity that elevates heartrate (e.g., running, jumping, etc.) for a certain amount of time. To give another specific example, instruction 212 may instruct the user to (1) wear the heartbeat sensors such that the heartbeat sensors may collect heartbeat data and then (2) remove the heartbeat sensors such that the heartbeat sensors may not collect heartbeat data. Similarly, in an embodiment in which user device 202 is attached to one or more blood pressure sensors, instruction 212 may instruct the user to attach himself to the blood pressure sensors such that the blood pressure sensors may collect blood pressure data. In this embodiment, the disclosed systems and methods may have previously collected blood pressure data from the user such that the blood pressure data collected as a result of instruction 212 may be compared with the previously collected blood pressure data and used for authentication purposes.

In embodiments in which user device 202 operates as part of an IoT network, instruction module 104 may instruct the user to perform a motion-based activity that may be detected by a sensor on an additional device within the IoT network. For example, the additional device may represent a thermostat embedded with one or more thermal sensors. In this example, instruction 212 may instruct the user to move in a way that affects the amount of heat detected by the thermal sensors. To give a specific example, instruction module 104 may instruct the user to (1) place his hand directly above the thermostat for a specified amount of time and then (2) remove his hand. In another example, the additional device may represent a security camera in the user's home embedded with one or more motion sensors. In this example, instruction module 104 may instruct the user to move in a way that may be detected by the one or more motion sensors. To give a specific example, instruction module 104 may instruct the user to walk into a room where the security camera is located.

In some embodiments, the disclosed systems and methods may be directed at authenticating a user's identify. In these embodiments, instruction module 104 may, prior to presenting the user with instruction 212, have obtained a sequence of movements from the user. In one example, instruction module 104 may obtain the sequence of movements in response to directing the user to perform a sequence of movements that he wishes to use as an authenticating secret. In these examples, instruction module 104 may define the prescribed movement as the sequence of physical movements obtained from the user. Later, when instruction module 104 is attempting to authenticate the user (e.g., in response to one of the triggering events described above), instruction module 104 may direct the user to perform the sequence of physical movements which he previously set as his authenticating secret (i.e., without specifying which specific movements are includes within the sequence).

To give a specific example, instruction module 104 may instruct the user to set a motion secret that involves alternating short and long shakes of user device 202. In some examples, the instruction may define the term "short" as a certain length of time (e.g., 1 second) and term "long" as a certain length of time (e.g., 4 seconds). In other examples, the term "short" may simply refer to an amount of time that is relatively shorter than an amount of time referred to with the term "long." In response to receiving the instruction to set the motion secret, the user may shake the device the device twice long, then once short, then twice long, and finally twice short. Then, at a later moment in time when instruction module 104 is attempting to authenticate user device 202, instruction module 104 may present the user with instruction 212 which may direct the user to move user device 202 according to his motion secret. If, in response, the user shakes the device twice long, then once short, then twice long, and finally twice short, the disclosed systems and methods may authenticate the user (as will be discussed in more detail in connection with steps 304, 306, and 308).

In some examples, database 120 may maintain data describing user motion sequences obtained from users for authentication purposes. Using FIG. 5 as an example, database 120 may include a list of users (e.g., user 1, user 2, user 3, user 4, and user 5) and information describing the motion sequences selected by each user for authentication (e.g., user sequences 122). For example, database 120, as shown in FIG. 5, may indicate that the motion secret of user 1 is to (1) move his device from left to right, (2) move his device from high to low, and (3) shake his device. In this example, database 120 may also indicate that the motion of secret of user 2 is to (1) take two steps forward with her device, (2) stop, (3) take three steps backwards with her device, and (4) spin in a circle. In this example, database 120 may also indicate that the motion of secret of user 3 is to face a camera attached to the device and (1) wave his right hand, (2) lean left, and (3) clap. In this example, database 120 may also indicate that the motion of secret of user 4 is to (1) cover a light sensor long, (2) uncover the light sensor short, (3) cover the light sensor short, and (4) uncover light sensor long. Finally, in this example, database 120 may indicate that the motion of secret of user 5 is to clap to the beat of a particular song (i.e., the "Happy Birthday" song).

In some embodiments, instruction module 104 may, prior to presenting the user with instruction 212, determine that user device 202 is mobile (e.g., portable) and thereby capable of being physically moved by the user. In these examples, instruction module 104 may, in response to determining that user device 202 is mobile, send an instruction that involves moving user device 202. In one such example, instruction module 104 may determine that user device 202 is mobile because the user is accessing a mobile version of a website (e.g., m.xyz.com instead of xyz.com).

In addition or as an alternative to determining whether user device 202 is mobile, instruction module 104 may identify the types of sensors attached or otherwise associated with user device 202. In some examples, instruction module 104 may determine the types of sensors associated with user device 202 based on a device-type of user device 202. In these examples, instruction module 104 may (1) identify a device-type of user device 202 and (2) identify types of sensors that are associated with the identified device-type. To give a specific example, instruction module 104 may determine that user device 202 represents an iPHONE 5s. In this specific example, instruction module 104 may then determine (e.g., from information maintained by a database such as database 120) that the device "iPHONE 5s" typically includes (1) motion sensors, (2) a GPS receiver, and/or (3) visual and audio sensors. After identifying the types of sensors associated with user device 202, instruction module 104 may select a motion-based challenge for the user to perform based on the identified types of sensors. Thus, the disclosed systems and methods may alter which motion-based activity to use for verification based on the capabilities of user device 202.

Instruction module 104 may obtain information relating to the device-type of user device 202 and/or the types of sensors associated with user device 202 in various ways. In some examples, instruction module 104 may obtain information relating to the device-type of user device 202 and/or the sensor-type of sensors 210 from the user of user device 202 during a registration process. Additionally or alternatively, instruction module 104 may glean such information from information transmitted from a browser running on user device 202 to a webpage associated with instruction module 104 during a web session. For example, instruction module 104 may obtain this information from an HTTP header transmitted by the browser running on user device 202 to the webpage associated with instruction module 104.

In some examples, instruction module 104 may identify a location of user device 202. In one example, instruction module 104 may identify the location based on user input. In another example, instruction module 104 may identify the location based on GPS data received from user device 202. In yet another example, instruction module 104 may identify the location based on connection data (e.g., by determining which additional devices user device 202 is presently connected to). In these examples, instruction module 104 may identify, based on the location information and/or connection data, one or more additional devices to which user device 202 is presently connected. For example, instruction module 104 may identify one or more additional devices in an IoT network. In these examples, instruction module 104 may also identify sensors associated with the one or more additional devices and, based on the identified sensors, instruct the user to perform a motion-based activity that involves one or more of the additional devices and utilizes the capabilities of the identified sensors.

Returning to FIG. 3, at step 304, one or more of the systems described herein may receive information, collected by one or more sensors associated with the mobile device, describing physical movement performed by the user after the user receives the instruction. For example, receiving module 106 may, as part of server 206 in FIG. 2, receive information, collected by sensors 210, describing physical movement performed by the user after the user receives instruction 212.

Receiving module 106 may collect data from sensors 210 in a variety of ways. In some examples, receiving module 106 may operate as part of server 206, which may be managed by (1) a web service that provides services to the user or (2) a third-party verification service that provides verification services to the web service. In these examples, user device 202 may be configured to report, to server 206, telemetry data collected by sensors 210 after the user is presented with instruction 212. In one example, receiving module 106 may access the collected data via a public API that reports out the data collected by sensors 210. In addition, or as an alternative, to reporting the telemetry data collected by sensors 210 to server 206, user device 202 may be configured to report the telemetry data collect by sensors 210 to a backend system that manages user device 202. In this example, the backend system may then send the data obtained from sensors 210 to server 206.

To give a specific example, instruction module 104 may have instructed the user to "make an X in the air with your tablet." After this instruction is given, motion sensors embedded within user device 202 (e.g., sensors 210) may collect motion data that indicates that, after the instruction was given, user device 202 moved (1) diagonally from left to right and then (2) diagonally from right to left. The motion sensors may then transmit this collected motion data directly to server 206 (i.e., where receiving module 106 is operating) and/or to a backend system associated with user device 202. If the motion sensors transmit the collected motion data to the backend system, the backend system may then transmit the collected motion data to server 206 (i.e., to be received by receiving module 106).

In examples in which the motion-based activity involves an additional device within a network of user device 202 (e.g., an IoT network), receiving module 106 may receive the data collected by sensors embedded within the additional device in several ways. In one example, the additional device may transmit the data collected by its sensors to user device 202 which may then transmit the data to server 206 or a backend system (as described above). In a second example, the additional device may transmit the data directly to server 206. In a third example, the additional device may transmit the data to a backend server that manages the additional device which may then transmit the data to server 206.

At step 306, one or more of the systems described herein may determine, upon receiving the information collected by the sensors associated with the mobile device, that the user's physical movement matches the prescribed movement. For example, determination module 108 may, as part of server 206 in FIG. 2, determine, upon receiving module 106 receiving the information collected by sensors 210, that the user's physical movement matches the prescribed movement included in instruction 212.

Determination module 108 may determine that the user's physical movement matches the prescribed physical movement in a variety of ways. In examples in which instruction 212 instructed the user to move user device 202 in a particular manner, determination module 108 may determine that the information collected by sensors 210 indicates that the user moved user device 202 in a manner that corresponds to the movement included in instruction 212. To use the specific example described in step 304, instruction 212 may have instructed the user to "make an X in the air with your tablet" and receiving module 106 may have received motion data from sensors 210 that indicates that, after the instruction was given, user device 202 was moved (1) diagonally from left to right and then (2) diagonally from right to left. In this example, determination module 108 may determine that the user's physical movement matches the prescribed physical movement because user device 202 was moved in the shape of an "X," as was instructed in instruction 212.

Similarly, in examples in which instruction 212 instructed the user to move himself in a manner that could be captured by sensors 210 (e.g., without physically moving user device 202), determination module 108 may determine that the information collected by sensors 210 indicates that the user moved in a manner that corresponds to the prescribed movement included in instruction 212. To give a specific example, instruction 212 may have instructed the user to wave and then touch his nose in front of a video camera attached to user device 202 and receiving module 106 may have received visual data from sensors 210 within the video camera that indicates that, after the instruction was given, the user (1) waved and then (2) touched his nose in front of the video camera. In this example, determination module 108 may determine that the user's physical movement matches the prescribed physical movement because the user made the movements (i.e., waving and then touching his nose) included in instruction 212.

In some examples, determination module 108 may deduce the user's movement based on the data obtained from sensors 210. For example, in examples in which instruction 212 instructs the user to alternate covering and uncovering a light sensor according to a certain pattern, determination module 108 may deduce that the user covered and uncovered the light sensor according to the certain pattern if the amount of light received by the light sensor diminishes and increases in a pattern that matches the certain pattern.

In examples in which the disclosed systems and methods are attempting to verify an identity of the user, instruction 212 may have instructed the user to move in accordance with an authenticating secret previously set by the user (as discussed above in connection with step 302). In these examples, determination module 108 may determine that the information collected by sensors 210 indicates that the user moved in a manner that corresponds to the prescribed movement included in instruction 212 if the information collected by sensors 210 indicates that the user moved in accordance with the sequence of physical movements which he previously set as his authenticating secret.

At step 308, one or more of the systems described herein may verify the user in response to determining that the user's physical movement matches the prescribed movement. For example, verification module 110 may, as part of server 206 in FIG. 2, verify the user in response to determining that the user's physical movement matches the movement prescribed in instruction 212.

Verification module 110 may verify the user is a variety of ways. In one embodiment, verification module 110 may verify that the user is a human. In an additional or alternative embodiment, verification module 110 may verify (e.g., authenticate) an identity of the user. In both of these embodiments, verification module 110 may verify the user based on the user's ability to perform a motion-based activity captured by sensors 210 (e.g., motion sensors) associated with user device 202. Also, in both of these embodiments, verification module 110 may rely on data collected by sensors 210 as the basis for verification.

In some examples, instruction module 104 may have initiated the verification protocol described herein in response to detecting that that user had attempted to perform a certain digital action, as described above in connection with step 302. In these examples, verification module 110 may, in response to verifying the user, allow the user to perform the certain digital action. For example, if instruction module 104 initiated the verification protocol in response to the user attempting to log into an online user account, verification module 110 may, in response to verifying the user, allow the user to log into the user account.

In some examples, verification module 110 may operate as part of a web service through which the user is attempting to perform the certain digital action. In these examples, verification module 110 may allow the user to perform the certain digital action directly. In other examples, verification module 110 may operate as part of a third-party service that verifies users on behalf of a web service through which the user is attempting to perform the certain digital action. In these examples, verification module 110 may allow the user to perform the certain digital action indirectly by informing the web service that the user has been verified such that the web service may allow the user to perform the certain digital action.

As described above, the disclosed systems and methods describe a motion-based verification protocol. In some embodiments, the disclosed systems and methods may verify a user by (1) asking the user to perform a motion-based activity that a device being used by the user is capable of monitoring and (2) determining, based on the device's monitoring, that the user performed the motion-based activity. In some examples, the user's motion may be detected by motion sensors. In additional or alternative examples, the user's motion may be detected by various other sensors, including a light sensor, a visual sensor, an audio sensor, a thermal sensor, etc. Thus, as opposed to traditional verification protocols which verify users based on information inputted by the user via a touch screen, mouse, and/or keyboard, the disclosed systems and method may verify the user based on motion information collected by sensors connected to the device.

Figure 6:
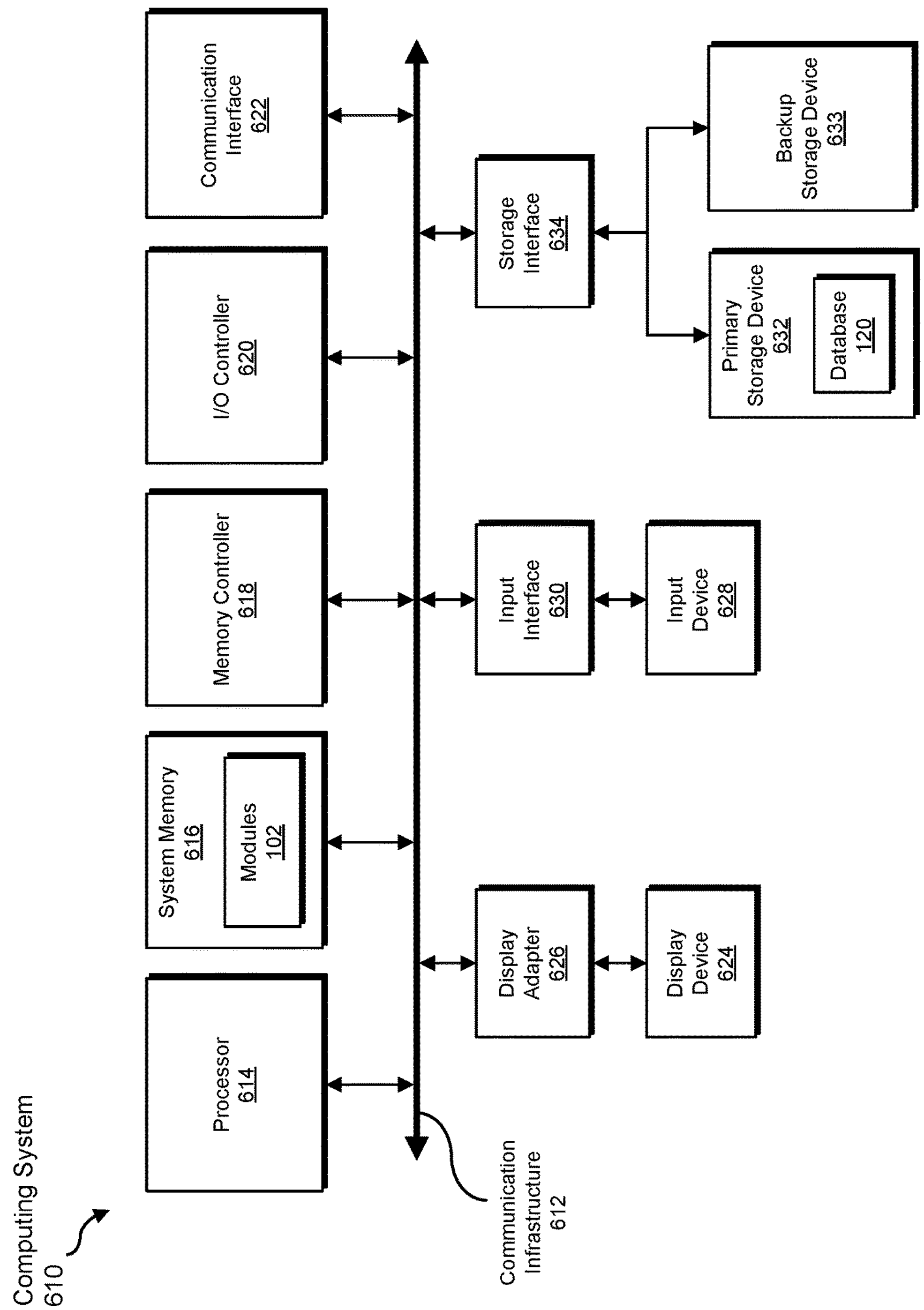
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
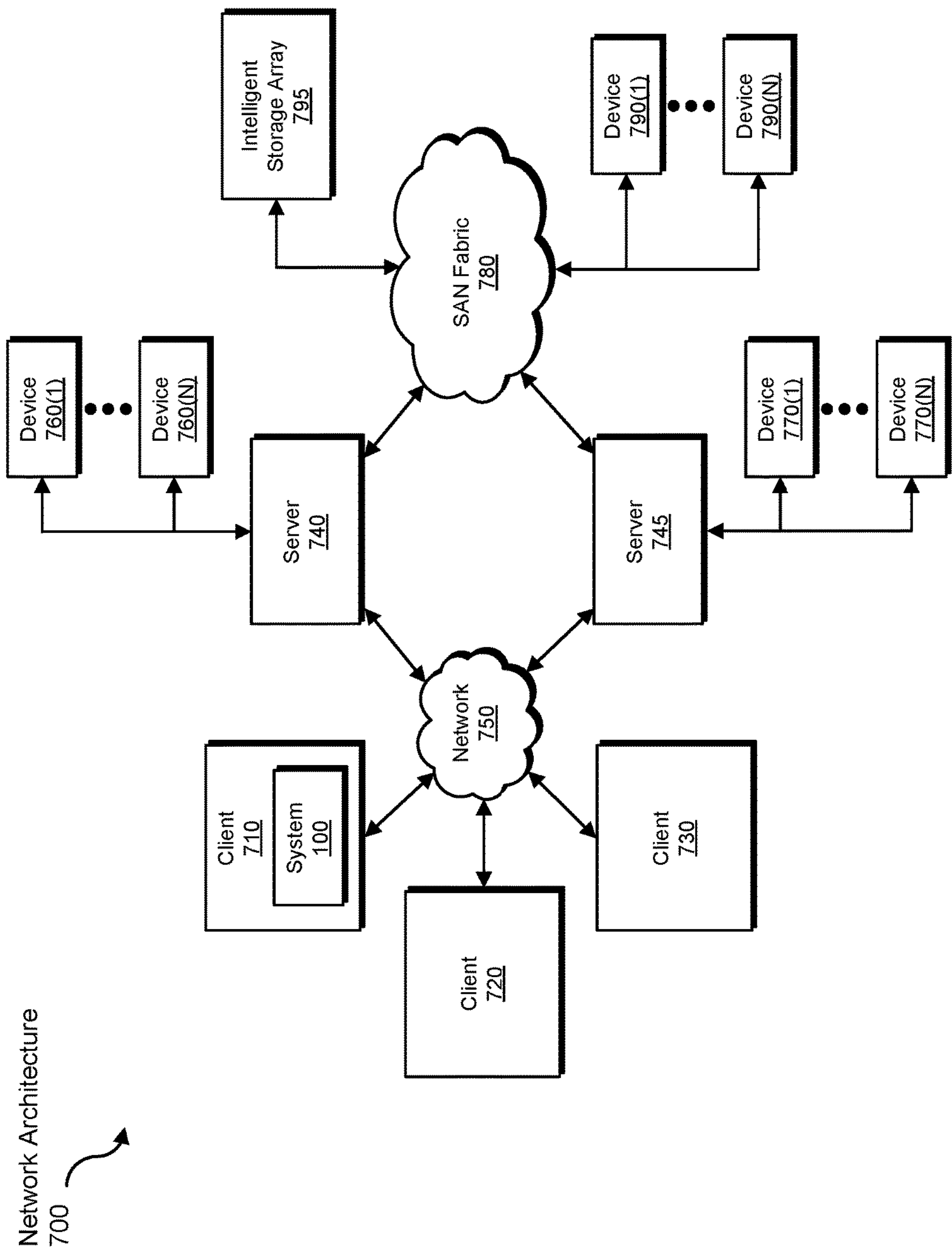
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for verifying users based on user motion.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may (1) receive motion data from one or more motion sensors, (2) transform the data into a description of a motion performed by a user, and (3) use the transformed data to verify the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying users based on user motion, at least a portion of the method being performed by a computing device comprising at least one processor, the method comprising:

as part of a registration process, instructing a user of a mobile device to set an authenticating motion secret, wherein:

the motion secret comprises a sequence of movements, detectable by one or more sensors associated with the mobile device, that involves taking one or more steps, the one or more sensors comprising a pedometer; and instructing the user to set the motion secret comprising instructing the user to select the sequence of movements and perform the sequence of movements with the mobile device on his or her person;

setting the motion secret based on information, collected by the sensors, describing the sequence of movements performed by the user;

after the registration process is completed, determining that the user is attempting to perform a digital action with a web service that requires its users to be verified before allowing the users to perform the digital action;

in response to determining that the user is attempting to perform the digital action, instructing the user to perform the sequence of movements corresponding to the motion secret with the mobile device on his or her person;

receiving information, collected by the sensors, describing physical movement performed by the user after the user receives the instruction, wherein the physical movement involves taking one or more steps and receiving the information comprises receiving information describing the one or more steps collected by the pedometer;

upon receiving the information, determining that the user's physical movement matches the sequence of movement corresponding to the motion secret; and verifying the identity of the user in response to determining that the user's physical movement matches the sequence of movements corresponding to the motion secret.

2. The computer-implemented method of claim 1, wherein the mobile device comprises a wearable fitness device.

3. The computer-implemented method of claim 1, wherein:

the one or more sensors further comprise a global positioning system receiver capable of detecting a geographic direction in which the mobile device is moving; and the sequence of movements further involves moving in a particular geographic direction.

4. The computer-implemented method of claim 1, wherein the one or more sensors further comprise a motion sensor.

5. The computer-implemented method of claim 1, wherein the sequence of movements further involves a motion-related activity that involves physically moving the mobile device relative to the user's body.

6. The computer-implemented method of claim 5, wherein the motion-related activity that involves physically moving the mobile device relative to the user's body comprises at least one of:

moving the mobile device from a current spatial location to a new spatial location;

moving the mobile device in a certain direction;

shaking the mobile device;

moving the mobile device in accordance with a designated pattern; and moving the mobile device for a specified amount of time.

7. The computer-implemented method of claim 6, wherein moving the mobile device to the new spatial location comprises at least one of:

moving the mobile device to a spatial location that is to the left of the current spatial location;

moving the mobile device to a spatial location that is to the right of the current spatial location;

moving the mobile device to a spatial location that is above the current spatial location;

moving the mobile device to a spatial location that is below the current spatial location;

moving the mobile device to a spatial location that is in front of the current spatial location; and moving the mobile device to a spatial location that is behind the current spatial location.

8. The computer-implemented method of claim 6, wherein moving the mobile device in the certain direction comprises at least one of:

moving the mobile device laterally;

moving the mobile device vertically;

moving the mobile device diagonally;

moving the mobile device clockwise; and moving the mobile device counterclockwise.

9. The computer-implemented method of claim 1, wherein the mobile device represents at least one of:

a smart watch;

smart glasses;

a smart phone; and the pedometer.

10. The computer-implemented method of claim 1, wherein the one or more sensors further comprise at least one of:

a thermal sensor;

a heartbeat sensor; and an audio sensor.

11. The computer-implemented method of claim 1, wherein:

the one or more sensors further comprise a light sensor configured to detect light; and the sequence of movements further involves at least one of:

covering the light sensor to reduce an amount of light detected by the light sensor;

uncovering the light sensor to increase an amount of light detected by the light sensor; and alternating between covering and uncovering the light sensor in accordance with a specified pattern.

12. The computer-implemented method of claim 11, wherein the light sensor is embedded within a screen of the mobile device and the mobile device is configured to select a level of brightness for the screen based on an amount of light detected by the light sensor.

13. The computer-implemented method of claim 1, wherein:

the one or more sensors further comprise a visual sensor; and the sequence of movements further involves moving within a visual field of the visual sensor such that the visual sensor may capture the user's physical movement.

14. The computer-implemented method of claim 1, wherein the digital action comprises at least one of:

logging into a user account managed by the web service;

modifying the user account managed by the web service; and using the web service to complete a transaction.

15. The computer-implemented method of claim 1, further comprising, upon verifying the user, allowing the user to perform the certain digital action.

16. The computer-implemented method of claim 1, wherein the pedometer measures a number of steps taken by the user based on a motion of at least one of the user's hands, the user's arms, and the user's hips.

17. A system for verifying users based on user motion, the system comprising:

an instruction module, stored in memory, that:

instructs a user of a mobile device to set an authenticating motion secret as part of a registration process, wherein:

the motion secret comprises a sequence of movements, detectable by one or more sensors associated with the mobile device, that involves taking one or more steps, the one or more sensors comprising a pedometer; and instructing the user to set the motion secret comprising instructing the user to select the sequence of movements and perform the sequence of movements with the mobile device on his or her person;

sets the motion secret based on information, collected by the sensors, describing the sequence of movements performed by the user;

after the registration process is completed, determines that the user is attempting to perform a digital action with a web service that requires its users to be verified before allowing the users to perform the digital action; and in response to the determination, instructs the user to perform the sequence of movements corresponding to the motion secret with the mobile device on his or her person;

a receiving module, stored in memory, that receives information, collected by the sensors, describing physical movement performed by the user after the user receives the instruction, wherein the physical movement involves taking one or more steps and the receiving module receives the information by receiving information describing the one or more steps collected by the pedometer;

a determination module, stored in memory, that determines, upon the receiving module receiving the information, that the user's physical movement matches the sequence of movements corresponding to the motion secret;

a verification module, stored in memory, that verifies the identity of the user in response to the determination that the user's physical movement matches the sequence of movements corresponding to the motion secret; and at least one physical processor configured to execute the instruction module, the receiving module, the determination module, and the verification module.

18. The system of claim 17, wherein the mobile device comprises a wearable fitness device.

19. The system of claim 17, wherein the digital action comprises at least one of:

logging into user account managed by the web service;

modifying the user account managed by the web service; and using the web service to complete a transaction.

20. A non-transitory computer-readable medium comprising one or more computer-readable instructions that, when executed by at least one processor of a computing device, cause the computing device to:

instruct a user of a mobile device to set an authenticating motion secret as part of a registration process, wherein:

the motion secret comprises a sequence of movements, detectable by one or more sensors associated with the mobile device, that involves taking one or more steps, the one or more sensors comprising a pedometer; and the computer-readable instructions cause the computing device to instruct the user to set the motion secret by causing the computing device to instruct the user to select the sequence of movements and perform the sequence of movements with the mobile device on his or her person;

set the motion secret based on information, collected by the sensors, describing the sequence of movements performed by the user;

after the registration process is completed, determine that the user is attempting to perform a digital action with a web service that requires its users to be verified before allowing the users to perform the digital action;

in response to the determination, instruct the user to perform the sequence of movements corresponding to the motion secret with the mobile device on his or her person;

receive information, collected by the sensors, describing physical movement performed by the user after the user receives the instruction, wherein the physical movement involves taking one or more steps and receiving the information comprises receiving information describing the one or more steps collected by the pedometer;

determine, upon receiving the information, that the user's physical movement matches the sequence of movements corresponding to the motion secret; and verify the identity of the user in response to determining that the user's physical movement matches the sequence of movements corresponding to the motion secret.

* * * * *

UNITED STATES PATENT AND TRADEMARK OFFICE

CERTIFICATE OF CORRECTION

PATENT NO. : 10,257,229 B1
APPLICATION NO. : 15/156742
DATED : April 9, 2019
INVENTOR(S) : Chengi Kuo et al.

It is certified that error appears in the above-identified patent and that said Letters Patent is hereby corrected as shown below:

In the Claims

In Column 22, Line 58, Claim 1, delete "movement" and insert -- movements --, therefor.

In Column 24, Line 26, Claim 15, after "perform the" delete "certain".

In Column 25, Line 15, Claim 19, after "logging into" insert -- a --.

Signed and Sealed this
Eleventh Day of June, 2019

Andrei Iancu
*Director of the United States Patent and Trademark Office*